(12) United States Patent
Yoshida

(10) Patent No.: US 12,514,784 B2
(45) Date of Patent: Jan. 6, 2026

(54) PLASTIC CAP AND CLOSED SYSTEM DRUG TRANSFER DEVICE

(71) Applicant: DAIKYO SEIKO, LTD., Sano (JP)

(72) Inventor: Takayuki Yoshida, Sano (JP)

(73) Assignee: DAIKYO SEIKO, LTD., Sano (JP)

( * ) Notice: Subject to any disclaimer, the term of this patent is extended or adjusted under 35 U.S.C. 154(b) by 0 days.

(21) Appl. No.: 18/254,773

(22) PCT Filed: Dec. 25, 2020

(86) PCT No.: PCT/JP2020/048648
§ 371 (c)(1),
(2) Date: May 26, 2023

(87) PCT Pub. No.: WO2022/137490
PCT Pub. Date: Jun. 30, 2022

(65) Prior Publication Data
US 2024/0033180 A1 Feb. 1, 2024

(51) Int. Cl.
*A61J 1/14* (2023.01)
*B65D 51/18* (2006.01)

(52) U.S. Cl.
CPC .......... *A61J 1/1425* (2015.05); *B65D 51/18* (2013.01)

(58) Field of Classification Search
CPC ........ A61J 1/1425; A61J 1/1406; B65D 51/18
USPC .................. 215/247, 249; 604/415
See application file for complete search history.

(56) References Cited

U.S. PATENT DOCUMENTS

| | | | | |
|---|---|---|---|---|
| 5,632,396 | A | * | 5/1997 | Burns .............. A61B 5/150732 220/254.1 |
| 5,772,652 | A | | 6/1998 | Zielinski ....................... 604/411 |
| 6,568,439 | B1 | * | 5/2003 | Se ........................ B65D 51/002 141/330 |
| 7,100,646 | B2 | * | 9/2006 | Py ........................ B65D 51/002 141/237 |

(Continued)

FOREIGN PATENT DOCUMENTS

| | | |
|---|---|---|
| CN | 108779320 A | 11/2018 |
| JP | H 11-164873 A | 6/1999 |

(Continued)

OTHER PUBLICATIONS

International Search Report dated Feb. 22, 2021, issued by the Japanese Patent Office in corresponding application PCT/JP2020/048648.

(Continued)

*Primary Examiner* — James N Smalley
(74) *Attorney, Agent, or Firm* — Stein IP LLC

(57) ABSTRACT

To provide a plastic cap that can be smoothly applied to either a synthetic resin or glass pharmaceutical container, which can maintain airtightness with no rotation of a rubber stopper when applied to a mouth portion of the pharmaceutical container capped with the rubber stopper.

Provided is a plastic cap attached to a pharmaceutical container, and the cap includes a top surface portion having an opening at the center thereof, a cylindrical skirt portion extending downward from an outer periphery of the top surface portion and opening at a lower end, and an inner cover inside the skirt portion, in which a coefficient of friction between the inner cover and the rubber stopper is higher than a coefficient of friction between the inner cover and the cap.

7 Claims, 11 Drawing Sheets

(56) References Cited

U.S. PATENT DOCUMENTS

| | | | |
|---|---|---|---|
| 8,863,967 B2* | 10/2014 | Suzuki | B32B 27/34 |
| | | | 206/524.1 |
| 2002/0142124 A1 | 10/2002 | Muraki | 428/64.1 |
| 2009/0145876 A1 | 6/2009 | Kawamura et al. | 215/353 |
| 2010/0168712 A1 | 7/2010 | Tuckwell et al. | 604/406 |
| 2010/0218846 A1 | 9/2010 | Kriheli | 141/5 |
| 2013/0184672 A1* | 7/2013 | Nord | A61J 1/2065 |
| | | | 604/414 |
| 2018/0134457 A1 | 5/2018 | Mutterle | B65D 39/0017 |
| 2018/0371250 A1 | 12/2018 | Karube | C08L 91/00 |

FOREIGN PATENT DOCUMENTS

| | | |
|---|---|---|
| JP | 3487748 B2 | 10/2003 |
| JP | 2007-217007 A | 8/2007 |
| JP | 2007-282891 A | 11/2007 |
| JP | 2009-137641 A | 6/2009 |
| JP | 2013-66748 A | 4/2013 |
| JP | 2016-54805 A | 4/2016 |

OTHER PUBLICATIONS

Office Action mailed Aug. 8, 2023, issued to Japanese Application No. 2022-570935.
First Office Action issued on May 16, 2024 by the Taiwan Intellectual Property Office for Taiwan Patent Application No. 109146162.
Extended European Search Report dated Jul. 12, 2024, issued by the European Patent Office in corresponding application EP 20966976.1.

* cited by examiner

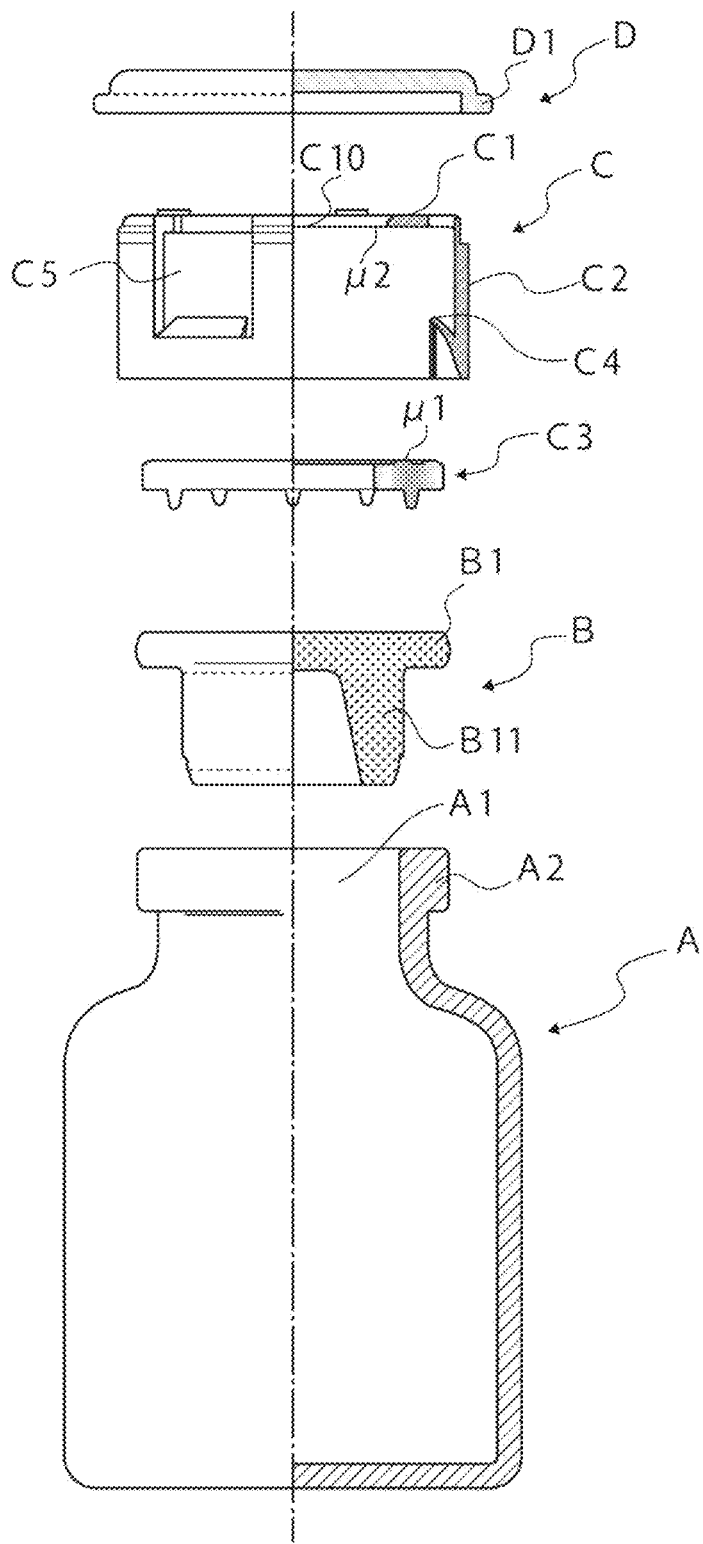
[FIG. 1]

[FIG. 2]
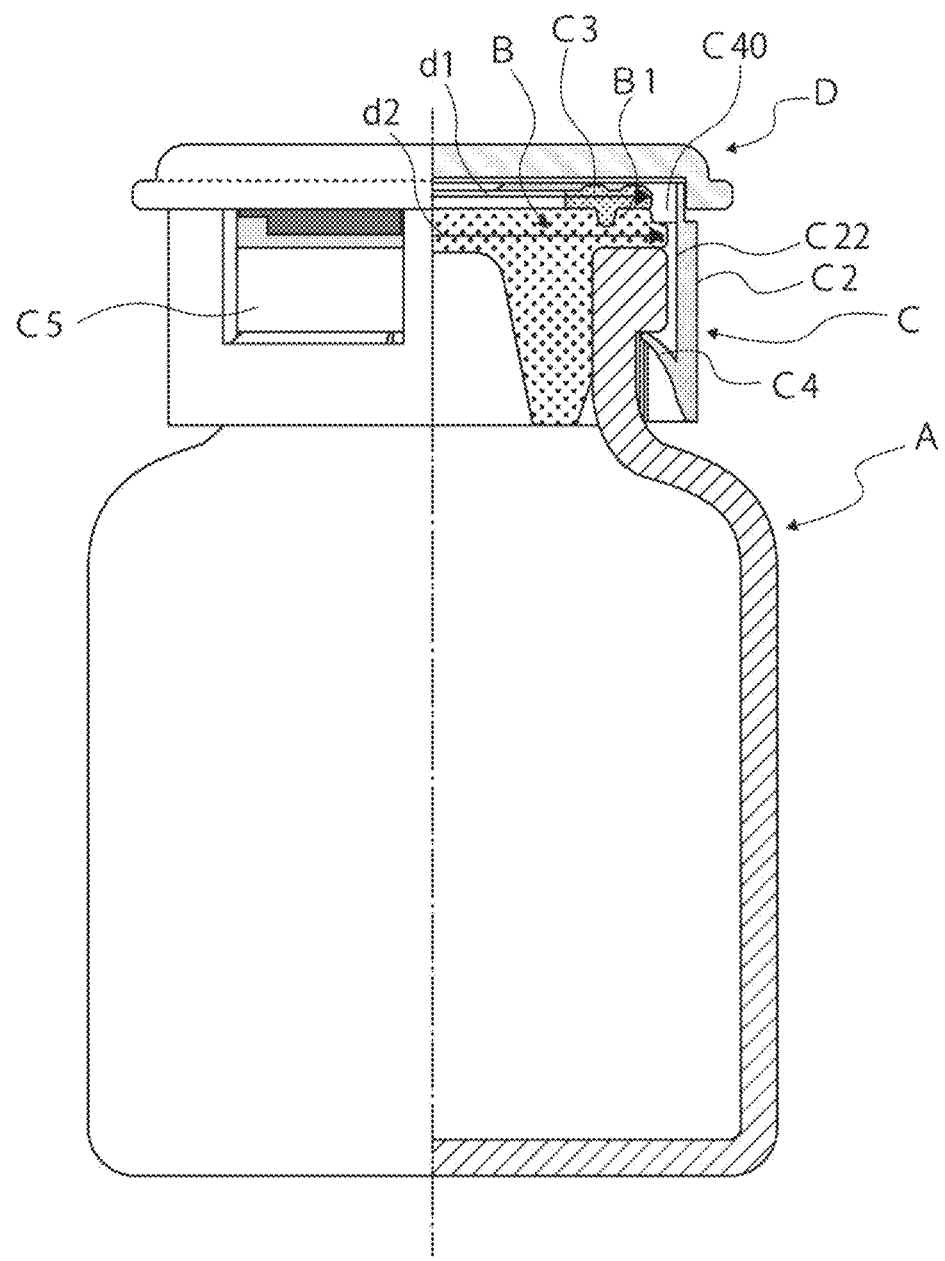

[FIG. 3]
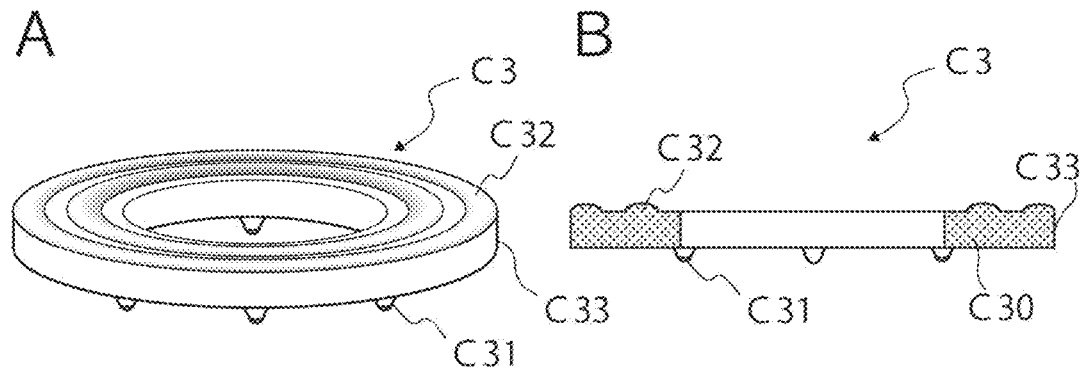
[FIG. 4]
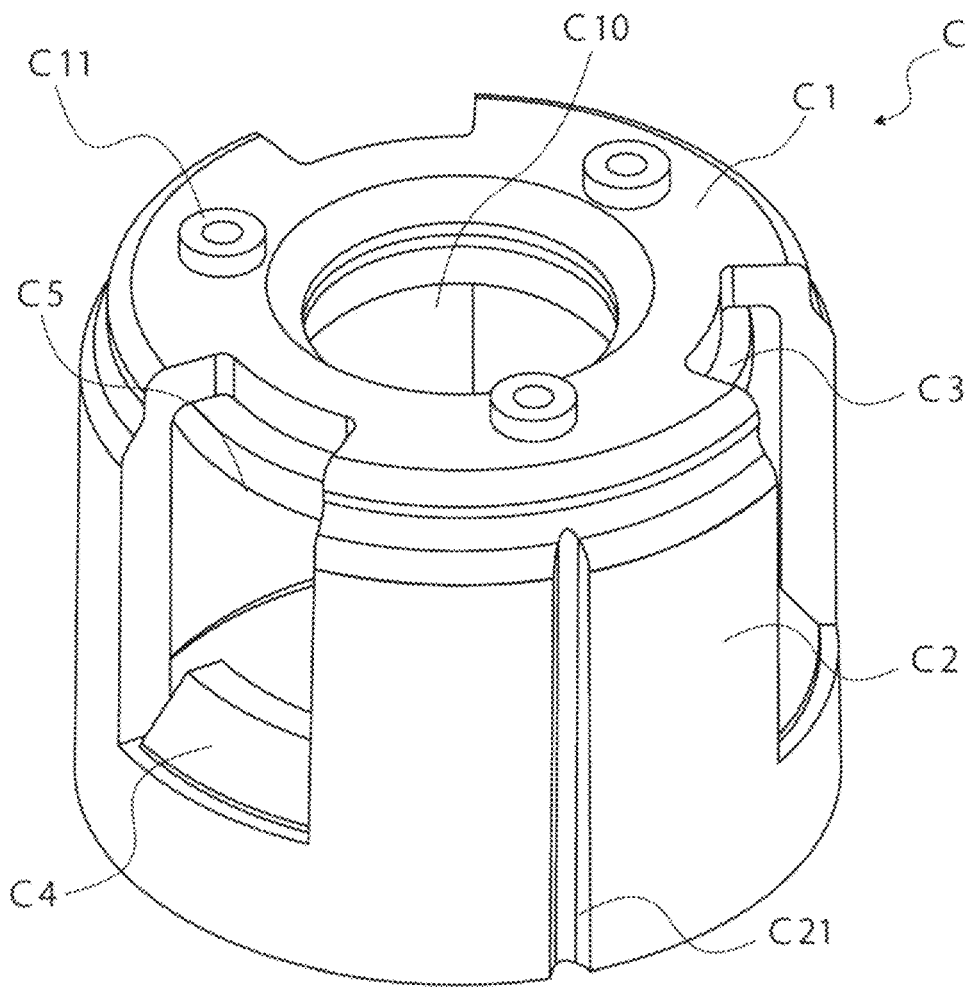

[FIG. 5]
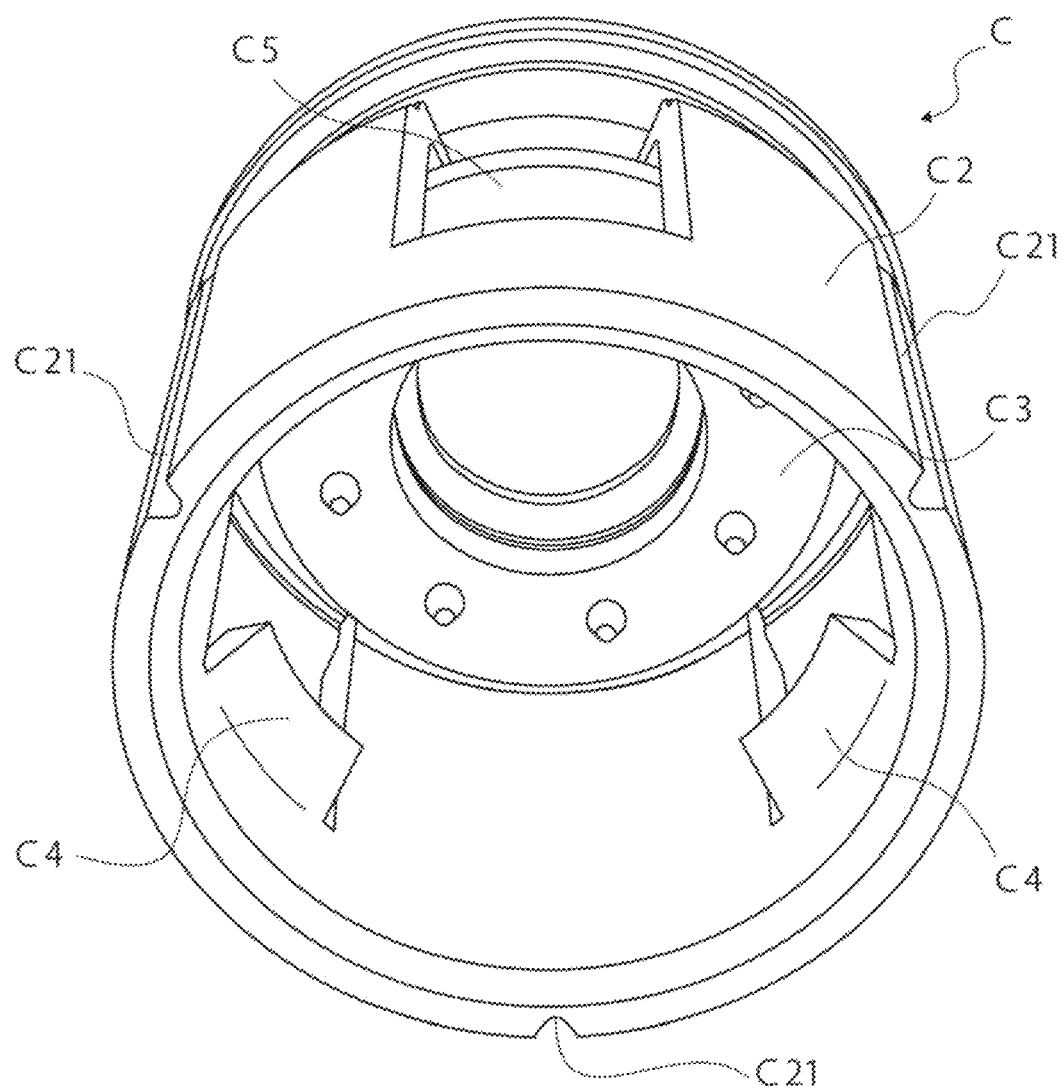

[FIG. 6]
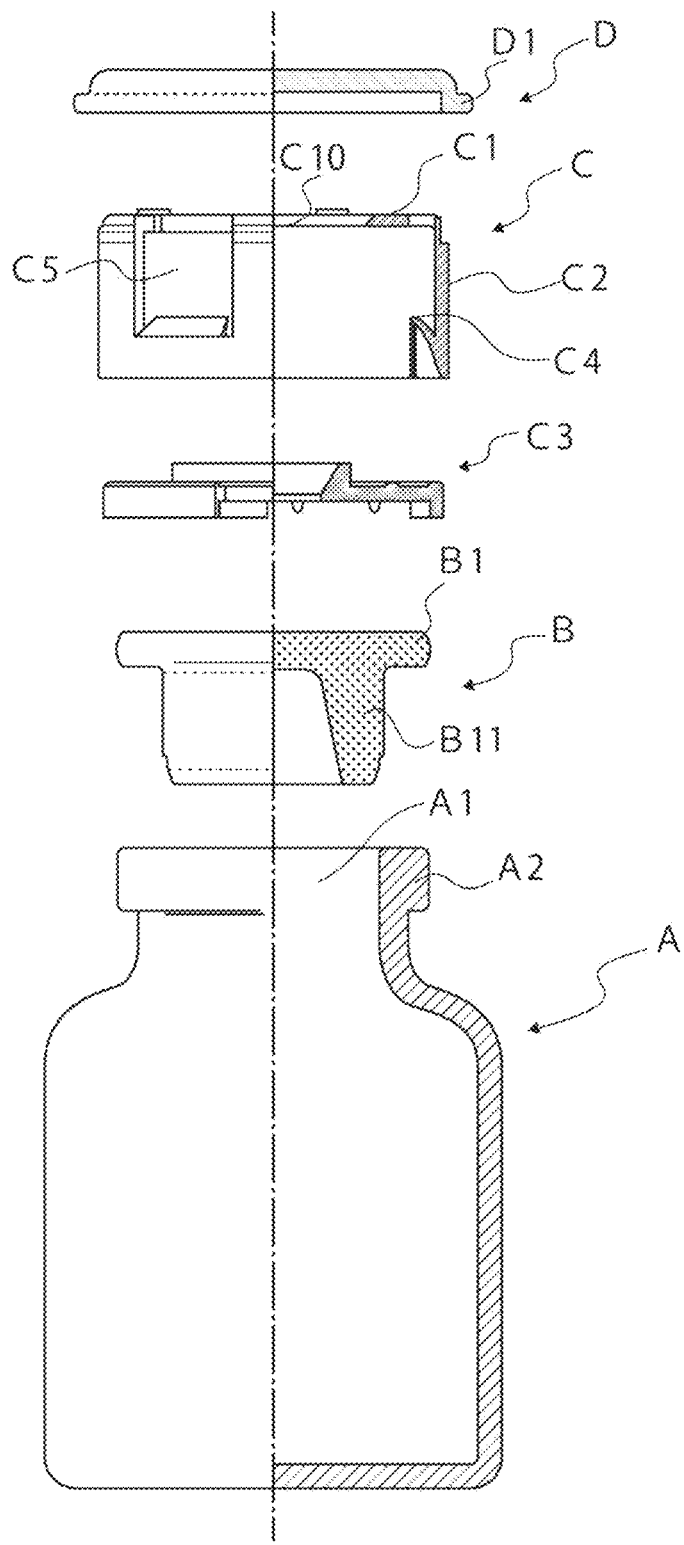

[FIG. 7]
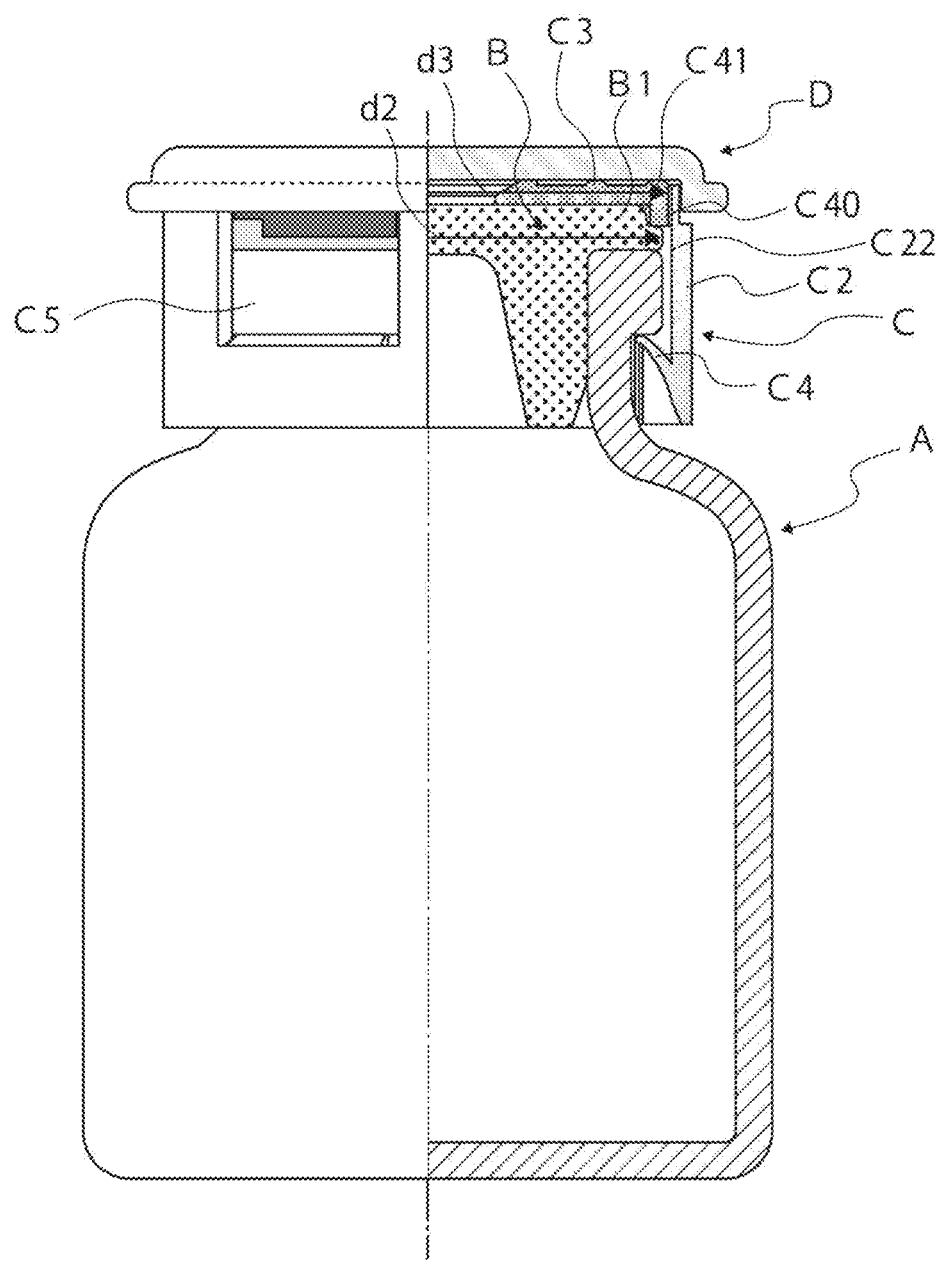

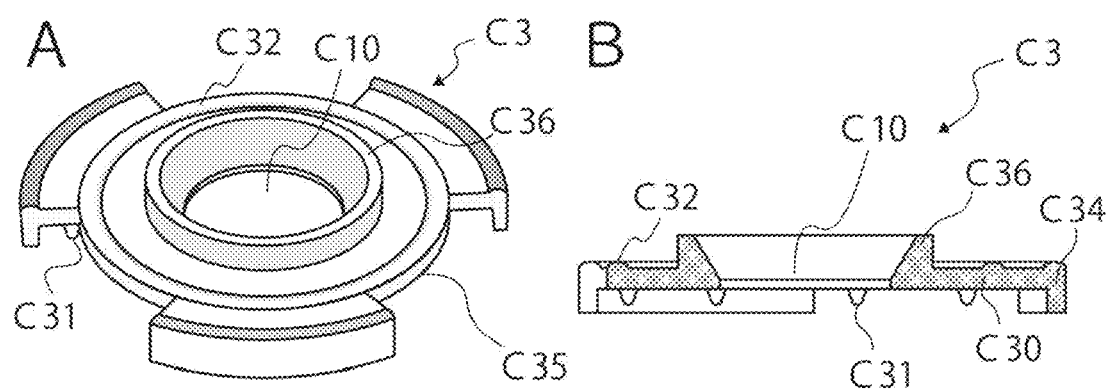
[FIG. 8]

[FIG. 9]
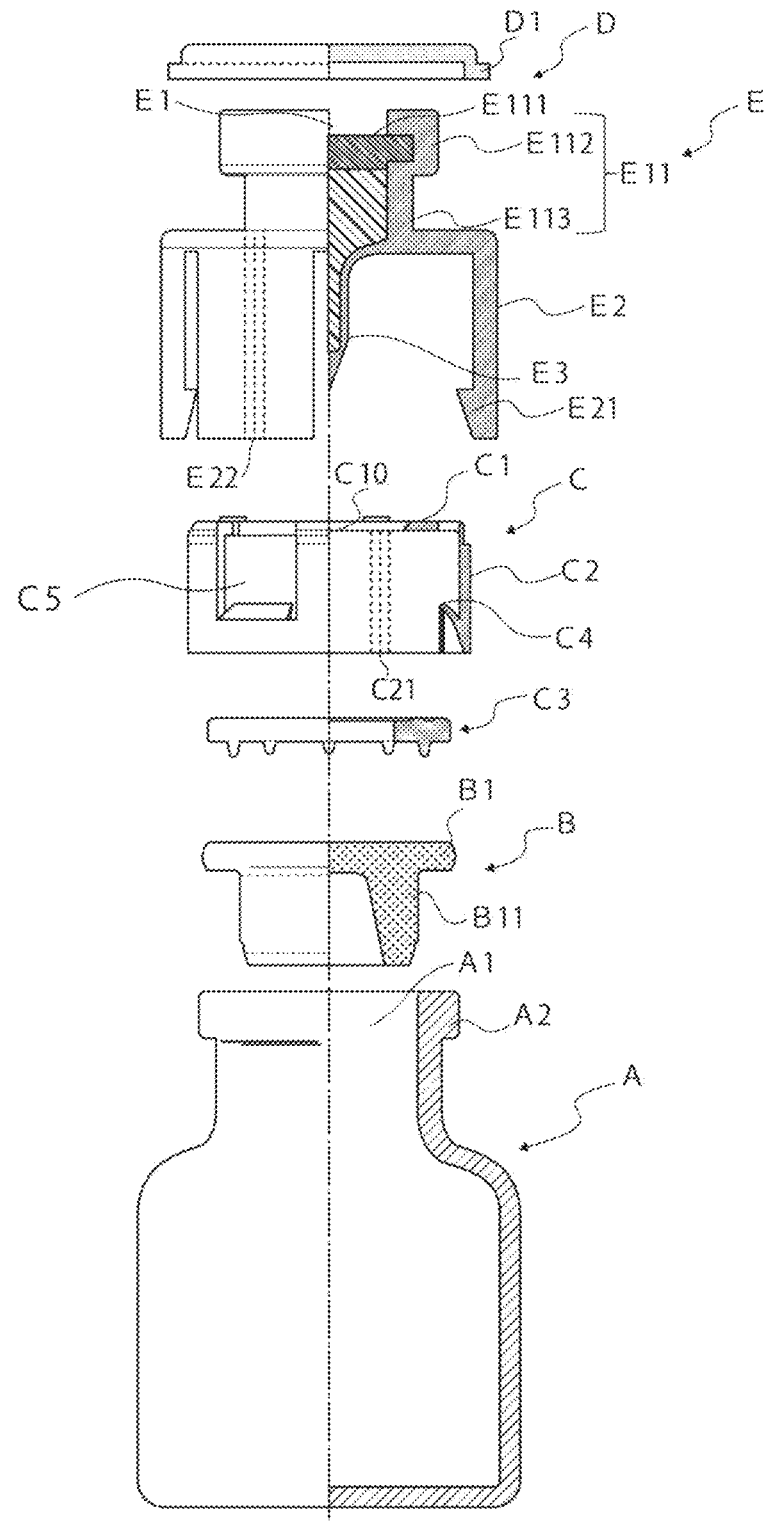

[FIG. 10]
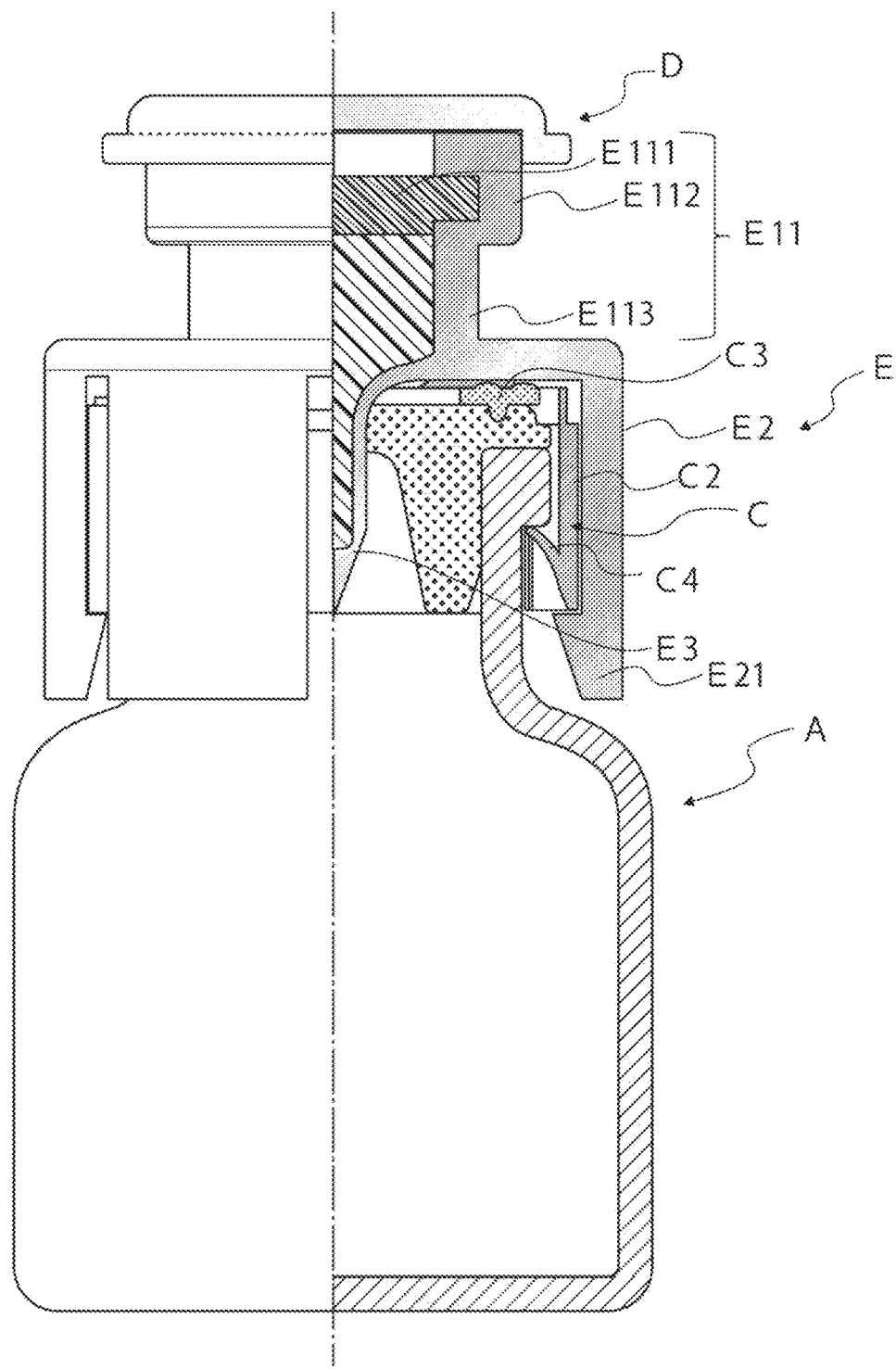

[FIG. 11]
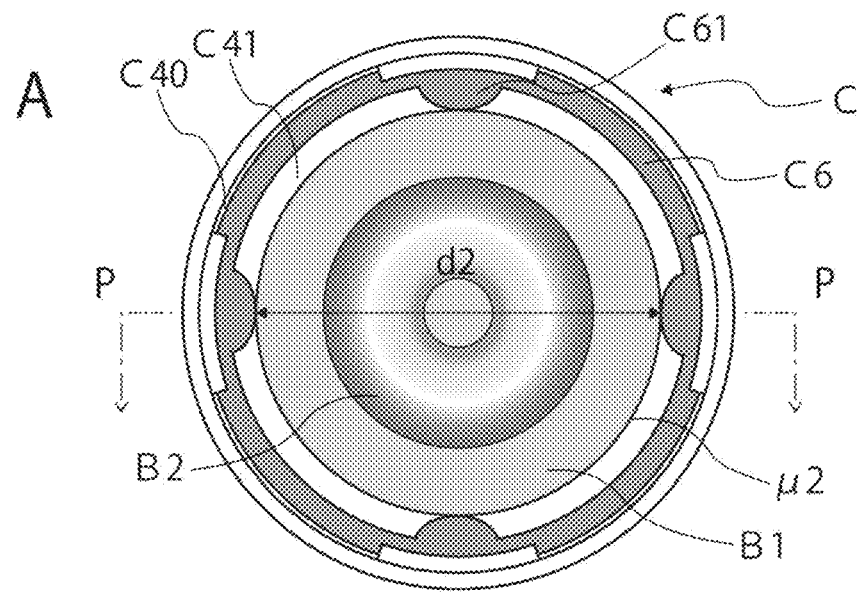
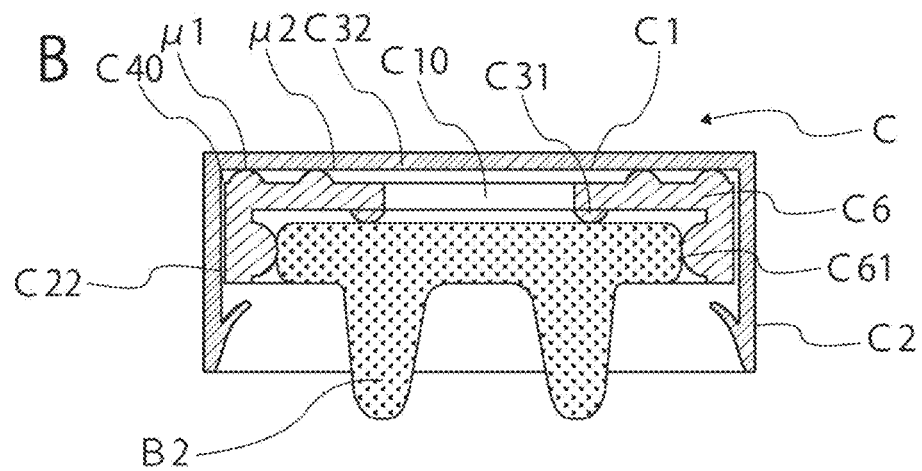

[FIG. 12]
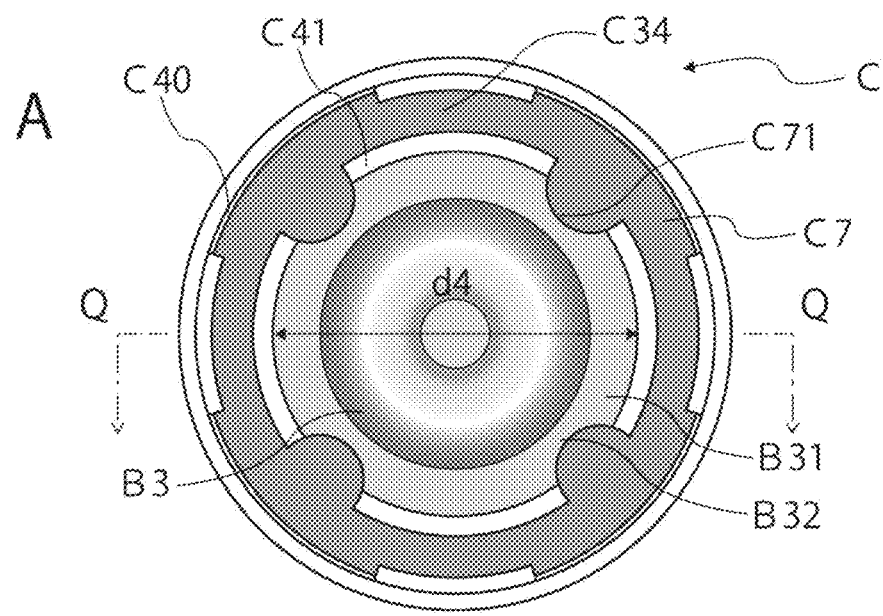
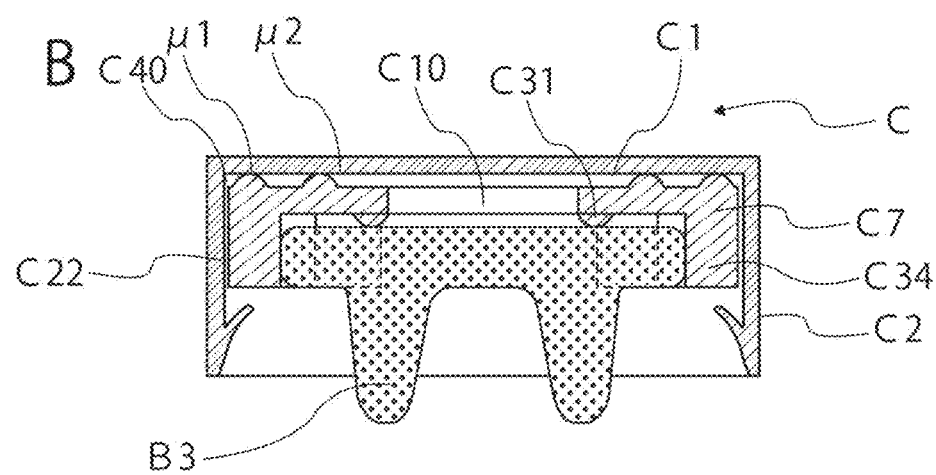

PLASTIC CAP AND CLOSED SYSTEM DRUG TRANSFER DEVICE

CROSS-REFERENCE TO RELATED APPLICATIONS

This application is a national stage of International Application No. PCT/JP2020/048648 filed Dec. 25, 2020, in the International Patent Office, the disclosure of which is incorporated herein by reference.

TECHNICAL FIELD

The present invention relates to a plastic cap and a closed system drug transfer device. More specifically, the present invention relates to a plastic cap that can be smoothly applied to either a synthetic resin or glass pharmaceutical container, that is, the plastic cap and a closed system drug transfer device that can maintain airtightness with no rotation of a rubber stopper when applied to a mouth portion of the pharmaceutical container capped with the rubber stopper.

BACKGROUND ART

Pharmaceutical containers such as a vial are widely used as storage containers for various drugs including pharmaceutical products in related art. These are pharmaceutical containers made of glass and made of synthetic resin. The synthetic resin pharmaceutical container is increasing from aspects of easiness in handling, dimensional stability at the mouth portion, and the like in recent years. On the other hand, the glass pharmaceutical container has an extremely higher gas-barrier property than the synthetic resin pharmaceutical container; therefore, the glass pharmaceutical container is used for a drug container requiring the high gas-barrier performance.

In both cases, the pharmaceutical container is used in a state where, after the drug is stored, the mouth portion of the pharmaceutical container is sealed with a rubber stopper to make the interior of the pharmaceutical container hermetically sealed. Furthermore, as the rubber stopper may come off from the pharmaceutical container when treatment such as heat sterilization is performed to the pharmaceutical container, it is common to fit an aluminum cap or a plastic cap to the pharmaceutical container so as to extend to a lower portion of a lip of the mouth portion of the pharmaceutical container in a manner of wrapping the rubber stopper in order to prevent the rubber stopper that caps the mouth portion of the pharmaceutical container from coming off and secure hermeticity in the pharmaceutical container. The aluminum cap widely used in related art is swaged at a position below the lip of the mouth portion of the pharmaceutical container by excellent deformability of aluminum, thereby exhibiting an excellent property of preventing coming-off of the rubber stopper. However, loading operation and the like of the drug are often performed in a clean room in recent years. There are problems that aluminum fine particles are generated and dispersed due to the collision of caps with each other and the like at the time of manufacturing or using it and that sorted disposal of aluminum after use is difficult; therefore, there is a tendency to hesitate to use the aluminum cap recently.

For this reason, the use of the plastic cap is increasing. Meanwhile, drugs stored in the pharmaceutical container are highly diversified, that is, for example, lyophilization treatment is performed to the drug in the pharmaceutical container and sealed after that. Therefore, various plastic caps which have high workability with many functions by devising the shape thereof have been proposed in recent years (see Patent Literatures 1, 2, and the like). However, there is a problem that the plastic cap is inferior to the aluminum cap in engagement with the pharmaceutical container when compared with the aluminum cap. This is because the plastic cap is formed by providing claws for engagement inside the cap and engaging the claws with the lip of the mouth portion of the pharmaceutical container to thereby fix the cap, which differs from the aluminum cap in which aluminum is freely deformed along the lip of the mouth portion of the pharmaceutical container and the cap is swaged at the mouth portion of the pharmaceutical container easily and firmly.

For this reason, the cap easily comes off from the pharmaceutical container when the pharmaceutical container and the plastic cap is engaged loosely. On the other hand, it becomes difficult to perform capping itself when the pharmaceutical container and the cap are engaged too tightly; therefore, high dimensional accuracy is required for both the cap and the pharmaceutical container in the case of the plastic cap. Concerning the above, when both the cap and the pharmaceutical container are made of synthetic resin, it is possible to increase the dimensional accuracy of both components because shrinkage deformation at the time of cooling can be calculated to mold the components into predetermined shapes. However, a dimensional error in the glass pharmaceutical container is one digit higher than that of the synthetic resin pharmaceutical container; therefore, there is a problem that it is difficult to sufficiently prevent coming-off of the cap even when the dimensional accuracy of the plastic cap is increased. The present applicant has already proposed, in response to the above problems, an inner shape of the plastic cap for the pharmaceutical container capable of securing tightness of the rubber stopper that caps the mouth portion of the pharmaceutical container not only in the case of the synthetic resin pharmaceutical container but also in the case of the glass pharmaceutical container that is inferior to the synthetic resin pharmaceutical container in dimensional accuracy (see Patent Literature 3). The cap has a structure in which an inner diameter of a skirt portion is formed greater than an outer diameter of a lip of the pharmaceutical container and a plurality of ribs are formed on an inner surface of the skirt portion in a direction perpendicular to a top surface portion to thereby absorb a dimensional error.

CITATION LIST

Patent Literature

PTL 1: JP2007-217007A
PTL 2: JP3487748B
PTL 3: JP2009-137641A

SUMMARY OF INVENTION

Technical Problem

The above-described plastic cap in related art can firmly hold the rubber stopper that caps the mouth portion of the pharmaceutical container, prevent coming-off positively, and exhibit extremely high effectiveness particularly for a force in an upper direction; therefore, it is incapable of removing, by hands, the cap which has been placed once. However, when the plastic cap receives a strong force in a lateral direction, even the rubber stopper may rotate so as to follow the placed cap. When the rubber stopper rotates, it is difficult to maintain the airtightness. Concerning the above, it is desirable that the rubber stopper does not rotate since a substance to be stored in the pharmaceutical container is for medical use.

In view of the above, the present invention provides a plastic cap that can be smoothly applied to either a synthetic resin or glass pharmaceutical container, which can maintain airtightness with no rotation of a rubber stopper when applied to a mouth portion of the pharmaceutical container capped with the rubber stopper.

Solution to Problem

That is, the present invention provides, first, a plastic cap (C) attached to a pharmaceutical container (A), and the cap (C) includes
- a top surface portion (C1) having an opening (C10) at the center thereof, a cylindrical skirt portion (C2) extending downward from an outer periphery of the top surface portion (C1) and opening at a lower end, and an inner cover (C3) provided inside the skirt portion (C2),
- in which a coefficient of friction between the inner cover (C3) and a rubber stopper (B) is higher than a coefficient of friction between the inner cover (C3) and the cap (C).

In the present invention, the inner cover (C3) may include a protrusion (C31) for engaging with the rubber stopper (B).

In the present invention, a plurality of protrusions (C31) may be formed.

In the present invention, the inner cover (C3) may include at least one or more convex shapes on a top surface portion (C32).

In the present invention, the skirt portion (C2) may include at least one or more slit portions (C21).

In the present invention, a cover (D) which is removable by fingers may be provided on an upper surface of the top surface portion (C1).

According to the present invention, there is also provided a closed system drug transfer device including
- a plastic cap (C) attached to a pharmaceutical container (A), the cap including a top surface portion (C1) having an opening (C10) at the center thereof, a cylindrical skirt portion (C2) extending downward from an outer periphery of the top surface portion (C1) and opening at a lower end, and an inner cover (C3) provided inside the skirt portion (C2), in which a coefficient of friction between the inner cover (C3) and a rubber stopper (B) is higher than a coefficient of friction between the inner cover (C3) and the cap (C); and
- a plastic adapter (E) attached to the plastic cap (C), the adapter including a top surface portion (E1) having a fitting portion (E11) at the center thereof, and a cylindrical skirt portion (E2) extending downward from an outer periphery of the top surface portion (E1) and opening at a lower end, in which the fitting portion (E11) has a lip (E112) and an intermediate tube (E113) extending downward from the lip (E112), and the fitting portion (E11) fits to a medical instrument used for the closed system drug transfer device.

Advantageous Effects of Invention

According to the present invention, it is possible to provide a plastic cap that can be smoothly applied to either a synthetic resin or glass pharmaceutical container, which can maintain airtightness with no rotation of a rubber stopper when applied to a mouth portion of the pharmaceutical container capped with the rubber stopper.

Note that the effects described here are not always limited to the above, and may be some of effects described in the specification.

BRIEF DESCRIPTION OF DRAWINGS

FIG. 1 is a view illustrating an example of an embodiment of a cap C according to the present invention.

FIG. 2 is a view illustrating an example of the embodiment of the cap C according to the prevent invention, which is applied to a pharmaceutical container A.

FIG. 3 A of FIG. 3 is a perspective view of an example of the embodiment of an inner cover C3, and B of FIG. 3 is a cross-sectional schematic view of A of FIG. 3.

FIG. 4 is a perspective view of an example of the embodiment of the cap C according to the present invention, which is seen from above.

FIG. 5 is a perspective view of an example of the embodiment of the cap C according to the present invention, which is seen from the bottom.

FIG. 6 is a view illustrating an example of another embodiment of the cap C according to the present invention.

FIG. 7 is a view illustrating an example of another embodiment of the cap C according to the prevent invention, which is applied to the pharmaceutical container A.

FIG. 8 A of FIG. 8 is a perspective view of an example of another embodiment of the inner cover C3, and B of FIG. 8 is a cross-sectional schematic view of A of FIG. 8.

FIG. 9 is a view illustrating an example of an embodiment of a closed system drug transfer device according to the present invention.

FIG. 10 is a view illustrating an example of the embodiment of the closed system drug transfer device according to the present invention, which is applied to the pharmaceutical container A.

FIG. 11 A of FIG. 11 is a bottom view of an example of another embodiment (inner cover (C6)) of the inner cover C3, and B of FIG. 11 is a cross-sectional schematic view taken along P-P line of A of FIG. 11.

FIG. 12 A of FIG. 12 is a bottom view of an example of another embodiment (inner cover (C7) of the inner cover C3, and B of FIG. 12 is a cross-sectional schematic view taken along Q-Q line of A of FIG. 12.

DESCRIPTION OF EMBODIMENTS

Hereinafter, preferred embodiments of the present invention will be explained.

Embodiments described below are examples of a representative embodiment of the present invention, and the scope of the present invention should not be narrowly interpreted based on these examples.

1. Plastic Cap C

FIG. 1 is a view illustrating an example of an embodiment of a cap C according to the present invention.

The plastic cap C according to the present invention is a cap for preventing coming-off of a rubber stopper B that seals an opening A1 of a pharmaceutical container A. The cap C includes a top surface portion C1 having an opening C10 at the center thereof, a cylindrical skirt portion C2 extending downward from an outer periphery of the top surface portion C1 and opening at a lower end, and an inner cover C3 provided inside the skirt portion. Moreover, a coefficient of friction between the inner cover C3 and the rubber stopper B is higher than a coefficient of friction between the inner cover C3 and a lower surface of the top surface portion C1. Therefore, even when a force in a lateral direction is added to the cap C according to the present invention in a state where the cap C according to the present invention is applied and fitted to the capped rubber stopper B, the cap C only rotates in an idling fashion without the inner cover C3 following the rotation, and the rubber stopper B does not rotate. Consequently, the airtightness of the rubber stopper B can be maintained.

As illustrated in FIG. 3, the inner cover C3 is formed in an annular shape, an outer diameter of which is smaller than an outer diameter of a canopy portion B1 of the rubber stopper B (not illustrated) so as not to cover a side surface of the canopy portion B1. Moreover, protrusions C31 for engaging with the rubber stopper B are formed on a lower surface of a base portion C30. A plurality of protrusions C31 are preferably provided. For example, it is preferable that a plurality of protrusions C31 are formed at positions in a concentric circle shape of the inner cover C3. According to the above, the coefficient of friction between the inner cover C3 and the rubber stopper B can be further increased, as a result, rotation of the rubber stopper B can be inhibited.

Furthermore, as illustrated in FIG. 2, an upper surface of the inner cover C3 contacts the lower surface of the top surface portion C1 of the cap C, and the protrusions C31 provided on the lower surface of the inner cover C3 are engaged with the rubber stopper B.

It is characterized in that a side surface C33 of the inner cover C3 does not contact an inner wall surface C22 of the skirt portion C2 and a gap C40 is provided. Consequently, the side surface C33 of the inner cover C3 does not contact the cap C and does not rotate together even when the cap C is rotated; therefore, rotation of the rubber stopper B attached to the pharmaceutical container A can be inhibited.

The inner cover C3 has at least one or more, preferably, two convex shapes on a top surface portion C32 as illustrated in FIG. 3. The plural convex shapes are formed to be annually continued, for example, at positions in a concentric circle shape of the inner cover C3. When at least one or more convex shapes are formed on the top surface portion C32 of the inner cover C3, a contact area between the inner cover C3 and the cap C can be reduced and a coefficient of friction between the inner cover C3 and the cap C can be reduced.

As illustrated in FIG. 1, when $\mu 1$ represents a coefficient of friction of the inner cover C3, and $\mu 2$ represents a coefficient of friction of the cap C, it is characterized in that $\mu 1 < \mu 2$ in a case where the inner cover C3 side has slipperiness, assuming that the cap C and the inner cover C3 rotate in an idling fashion in the preferred embodiment of the present invention.

In a case where the inner cover C3 side does not have slipperiness, $\mu 1 \geq \mu 2$.

The coefficient of friction $\mu 1$ of the inner cover C3 indicates a coefficient of static friction which differs according to materials described later, indicating a coefficient of friction on a surface of the inner cover C3, specifically, the top surface portion C32 or the side surface (regardless of the inside or the outside) of the inner cover C3, which is within a range of $0 < \mu 1 < 1$.

The coefficient of friction $\mu 2$ of the cap C indicates a coefficient of static friction which differs according to materials described later in the same manner as the coefficient of friction $\mu 1$ of the inner cover C3, indicating a coefficient of friction on the lower surface of the top surface portion C1 which is a portion contacting the inner cover C3 or on the skirt portion C2 of the cap C (especially the inner wall surface C22), which is within a range of $0 < \mu 2 < 1$. Note that the coefficient of friction $\mu 2$ of the cap C may simply have a difference (numerical value) with respect to the coefficient of friction $\mu 1$ of the inner cover C3.

The cap C has at least one or more slit portions C21 in the skirt portion C2 as illustrated in FIG. 4 and FIG. 5. A plurality of slit portions C21 are preferably formed, which are formed, for example, at three places. The slit portions C21 can be used as a positioning mechanism for a later-described plastic adapter E.

Moreover, the cap C has at least one or more through holes C5 in the skirt portion C2 as illustrated in FIG. 4 and FIG. 5. The through hole C5 has an approximately rectangular shape as a front shape, which is provided from the side surface of the skirt portion C2 toward the top surface portion C1 of the cap C. Since the through hole C5 is provided, whether a locking claw C4 is fitted at the opening A1 or not can be visually checked when the cap C is attached to the opening A1 of the pharmaceutical container A. The one or more through holes C5 are provided, which are preferably formed, specifically, at three places.

The rubber stopper B cited below is preferable for securing higher hermeticity and for suppressing rotation of the rubber stopper B together with the cap C with respect to the force in the lateral direction also from an aspect of the material. That is, a plastic film is laminated on a leg portion B11 of the rubber stopper B, and it is preferable that a lubricant such as silicone is not applied thereto.

In addition, a lower portion of a canopy portion B1 is a rubber base surface, and further, a root of the leg portion B11 of the rubber stopper B is preferably the rubber base surface.

Furthermore, a top surface of the canopy portion B1 of the rubber stopper B to which the lubricant such as silicone is not applied is preferably used. That is because protein aggregation occurs when the lubricant such as silicone is applied. When slipperiness is necessary on the top surface of the canopy portion B1 of the rubber stopper B, the plastic film may be laminated. There is a danger that the lubricant moves to a portion other than an applied portion in a cleaning process or the like of the rubber stopper B, and when the lubricant adheres to the lower portion of the canopy portion B1 or the like, the rotation of the rubber stopper B is induced; therefore, it is preferable to avoid the use thereof. General plastic films such as films of polyethylene, polypropylene, and fluorine-based resin can be used as the plastic film used for the rubber stopper B.

As materials for forming the cap C according to the present invention, for example, a fluorine-based resin, a polyethylene-based resin, a polypropylene-based resin (PP, including not only a homopolymer but also a copolymer obtained by copolymerizing an ethylene group, a butylene group or the like), a polyester-based resin (PET), a polysulfone-based resin (PSF), a methyl pentene-based resin (PMP), a polyacrylate-based resin (PAR), a polyamide-based resin (PA), a modified polyphenylene oxide resin (m-PPE), a resin containing a cyclic olefin-based compound or a bridged polycyclic hydrocarbon compound as a polymer component, a polycarbonate-based resin (PC), a resin obtained by modifying (grafting) an olefin-based resin using a polar group, and the like can be cited; however, the materials are not limited to the above as long as the material does not have a problem in conditions for autoclave sterilization, which are, for example, heat resistance for withstanding 121° C. for 20 minutes, or a problem in strength such as deterioration and a crack, and the material can be sterilized by radiation sterilization and the like. When the cap C is formed of plastic, aluminum powder is not generated even when the caps are rubbed against each other or collided with each other as compared with the related art aluminum cap. Additionally, the cap C can be manufactured by, for example, injection molding; therefore, the degree of freedom in shape and structure is high.

A material for forming the inner cover C3 may simply be a resin excellent in heat resistance, slipperiness, sterilization resistance, and strength, which includes a thermoplastic resin, a thermoplastic elastomer (TPE), and a polyolefin-based resin; however, the material is not limited to the above, and can be suitably selected in consideration of materials of or slipperiness between the rubber stopper B and the inner cover C3. Specifically, for example, the material may include a fluorine-based resin, a polyethylene-based resin, a polypropylene-based resin (PP, including not only a homopolymer but also a copolymer obtained by copolymerizing an ethylene group, a butylene group or the like), a polyester-based resin (PET), a polysulfone-based resin (PSF), a methyl pentene-based resin (PMP), a polyacrylate-based resin (PAR), a polyamide-based resin (PA), a modified polyphenylene oxide resin (m-PPE), a resin containing a cyclic olefin-based compound or a bridged polycyclic hydrocarbon compound as a polymer component, a polycarbonate-based resin (PC), a resin obtained by modifying (grafting) an olefin-based resin using a polar group, polyacetal (POM) that is excellent in wear resistance, flexible polyvinyl chloride (flexible PVC), thermoplastic polyurethane (TPU), and the like.

Moreover, the cap C and the inner cover C3 may be formed of the same material as well as formed of different materials.

The cap C according to the present invention may be provided with a plurality of locking claws C4 engaging with the lower portion of the lip A2 of the pharmaceutical container A as illustrated in FIG. 5. According to the above, even when a force toward an upper direction is added to the cap C, the cap C is not removed and coming-off of the rubber stopper B can be prevented.

There are various types of methods for forming the locking claws C4 on an inner surface of the cap C. For example, a reverse-L shape is formed from the skirt portion C2 side of the cap C, thereby forming a large locking claw C4 easily. In this case, the same number of through holes C5 as the number of the locking claws C4 are formed along the outer periphery of the top surface portion C1 of the cap C as illustrated, for example, in FIG. 4.

In the cap C according to the present invention, a cover D which is removable by fingers is integrally provided on the upper surface of the top surface portion C1 as illustrated in FIG. 1 and FIG. 2. That is, it is preferable that the cap C and the cover D are formed of a synthetic resin such as polypropylene, protrusions C11 with flat tops are formed at plural places on the top surface portion C1 at the same time as illustrated in FIG. 4, and the cover D is adhered and fixed with an adhesive or heat fusion by using the tops. It is naturally possible to integrally form the cap C and the cover D by various types of methods. Although the cover D is not essential in the present invention, the cover D is preferably provided for preventing foreign substances such as dust from adhering to the opening C10 of the cap C. It is preferable that the cover D is provided with one or a plurality of finger hooks D1 formed over the entire circumference or partially formed. A user can put a finger on the finger hook D1 to remove the cover D easily according to need.

The top surface portion C1 of the cap C has a disc shape, and the opening C10 through which a needle of a syringe or the like can pierce is formed at a central portion thereof, and the size of the opening C10 is not particularly limited as long as effects of the present invention can be obtained. The cylindrical skirt portion C2 is formed downward from the outer periphery of the top surface portion C1.

The cap C according to the present invention is provided with the reverse-L shaped locking claws C4 on an inner side of the skirt portion C2 as illustrated in FIG. 1 and FIG. 2. The locking claws C4 move downward while being elastically deformed toward the inner side at the time of fitting to the pharmaceutical container A, and when tips of the locking claws C4 pass an outer peripheral surface of the lip A2, the locking claws C4 return to an original state and the tips of the locking claws C4 abut on a concave portion at a lower portion of the lip A2 to thereby prevent the cap C from coming off. The number of the locking claws C4 is not particularly limited, and at least two or more locking claws C4 are preferably formed. Note that the shape and the like of the locking claw C4 are not particularly limited as long as effects of the present invention can be obtained.

A method for using the cap C according to the present invention described above will be explained with reference to FIG. 1.

First, after the pharmaceutical container A is filled with a desired drug, the rubber stopper B with a suitable size is fitted into the opening A1 of the pharmaceutical container A to seal the pharmaceutical container A. In the above state, there is a danger that the rubber stopper B comes off at the time of handling the pharmaceutical container A, for example, at the time of heat sterilization or the like. Accordingly, after the cap C is fitted to the pharmaceutical container A sealed with the rubber stopper B by preferably using a capping machine, the locking claws C4 with the reverse check-mark shape are elastically deformed and move downward in a state of being pushed to the skirt portion C2 side while contacting the outer peripheral surface of the lip A2 as the cap C moves downward, and when tips of the locking claws C4 pass the outer peripheral surface of the lip A2, the locking claws C4 return to the original state, and the rubber stopper B and the cap C are fixed to each other.

When the cap C according to the present invention is fitted to the pharmaceutical container A, the reverse-L shaped locking claws C4 are engaged with the lower portion of the lip A2 as illustrated in FIG. 2; therefore, the cap C does not come off due to the locking claws C4 engaged with the lower portion of the lip A2 even when a strong force is added in an upper direction of the cap C according to the present invention. Moreover, in the cap C according to the embodiment, the coefficient of friction between the inner cover C3 and the rubber stopper B is higher than the coefficient of friction between the inner cover C3 and the lower surface of the top surface portion C1. Therefore, even when the force in the lateral direction is added to the cap C according to the present invention in a state where the cap C according to the present invention is applied and fitted to the capped rubber stopper B, the cap C only rotates in an idling fashion, and the rubber stopper B does not rotate.

In the above described example, after the rubber stopper B is fitted to the opening A1 of the pharmaceutical container A so as to make the pharmaceutical container A hermetically sealed, the cap C is fitted by using the capping machine or the like; however, the present invention is not limited to this. For example, it is possible to fit the cap C by allowing the rubber stopper B to be held in the cap C, placing the cap C on the opening A1 of the pharmaceutical container A in this state, using the capping machine and the like after that.

As described above, in the cap C according to the present invention, the rubber stopper B is held in the cap C and the rubber stopper B can be half-capped on the opening A1 of the pharmaceutical container A in this state; therefore, it is extremely effective in a case where the drug loaded in the pharmaceutical container A is lyophilized. That is, when using the cap C according to the present invention, gas generated in the pharmaceutical container A in a lyophilization process can be exhausted quickly along the rubber stopper B in a half-capped state, and, at the same time, the rubber stopper B can be fully capped extremely quickly by using the capping machine or the like after the lyophilization is completed. Furthermore, the problem of occurrence of the rotation of the rubber stopper B is solved in the capped state as described above.

2. Other Embodiments of Plastic Cap

FIG. 6 and FIG. 7 are views illustrating examples of another embodiment of the cap C according to the present invention. Moreover, A of FIG. 8 is a perspective view of an example of another embodiment of the inner cover C3, and B of FIG. 8 is a cross-sectional schematic view of A.

The shape of the inner cover C3 is different in these other embodiments, and other structures are the same as the above embodiments. Note that the gap C40 is provided between the side surface of the inner cover C3 and the inner wall surface C22 of the cap C, and a gap C41 is provided between the inner cover C3 and the rubber stopper B.

The inner wall surface C22 of the cap C may contact the side surface of the inner cover C3.

The inner cover C3 illustrated in FIG. 2 and FIG. 3 is formed in the annular shape, an outer diameter d1 of which is smaller than an outer diameter d2 of the canopy portion B1 of the rubber stopper B so as to cover a top surface of the canopy portion B1 of the rubber stopper B, and further, so as not to cover part of a side surface of the canopy portion B1 of the rubber stopper B in a height direction thereof. On the other hand, in another embodiment illustrated in FIG. 7 and FIG. 8, the inner cover C3 has an annular shape, an outer diameter d3 of which is larger than the outer diameter d2 of the canopy portion B1 of the rubber stopper B, and further, one or more cutout portions C35 are provided in the base portion C30. In planar view from above, the opening C10 is provided at the center, and the base portion C30 is provided in an approximately propeller shape to have equal intervals with respect to three directions. An end of the base portion C30 has a shape, part of which is covered with a substantially L-shaped side surface cover C34 in a height direction of the side surface of the canopy portion B1 of the rubber stopper B.

In the inner cover C3, an approximately mortar-shaped guide C36 formed in the opening C10 communicating from the cap C (not illustrated) at the center of the inner cover C3, the annular base portion C30 integrally formed with the guide C36, and a plurality of convex-shaped top surface portions C32 formed on an upper surface of the base portion C30 are provided as illustrated in FIG. 8. Moreover, the annular base portion C30 can be provided with the cutout portions C35 at equal intervals. Note that, when the cutout portions C35 are provided, the rubber stopper B can be extended to the cutout portions C35 even when the rubber stopper B placed on a lower surface of the inner cover C3 is pressed; therefore, a capping pressure of the rubber stopper B can be reduced.

Additionally, the protrusions C31 for engaging with the rubber stopper B are formed on a lower surface of the base portion C30 and on an inner side of the side surface cover C34. A plurality of the protrusions C31 are preferably provided, for example, at positions in a concentric circle shape of the inner cover C3. According to the above, the coefficient of friction between the inner cover C3 and the rubber stopper B becomes higher than the coefficient of friction between the inner cover C3 and the cap C, as a result, only the cap C rotates, and rotation of the inner cover C3 and the rubber stopper B can be inhibited.

The inner cover C3 has at least one or more convex shapes on the top surface portion C32 of the inner cover C3 as illustrated in FIG. 8. Plural convex shapes are formed to be annually continued, for example, at positions in the concentric circle shape of the inner cover C3. When at least one or more convex shapes are formed on the top surface portion C32 of the inner cover C3, a contact area between the inner cover C3 and the lower surface of the top surface portion C1 in the cap C can be reduced and a coefficient of friction between the inner cover C3 and the lower surface of the top surface portion C1 can be reduced.

Note that a vertical cross-sectional shape of the convex shape is an approximately semicircle in the present embodiment; however, the shape is not limited to this.

Furthermore, other embodiments (inner cover (C6, C7)) in which the shape of the inner cover C3 is different will be explained with reference to FIG. 11 and FIG. 12.

Another embodiment illustrated in FIG. 11, as compared with the embodiment illustrated in FIG. 8, is the same in a point that the top surface and the side surface in the canopy portion B1 of a rubber stopper B2 are covered with the inner cover; however, it is characterized in that contact points between the inner cover and the side surface of the canopy portion B1 of the rubber stopper B2 are formed in a protruding shape, and that a contact area at side surface in a case where the inner cover contacts the side surface of the rubber stopper B2 is smaller in an inner cover C6 illustrated in FIG. 11 than in the inner cover C3 illustrated in FIG. 8.

The inner cover C6 is characterized in that the inner cover C6 has a circular shape with no cutout, an outer diameter of which is larger than the outer diameter d2 of the canopy portion B1 of the rubber stopper B2 as illustrated in FIG. 11, and contacts the side surface of the canopy portion B1 of the rubber stopper B2 at protrusions C61 provided in the inner cover C6.

Note that the gap C40 is provided between the side surface of the inner cover C6 and the inner wall surface C22 of the cap C; however, the inner wall surface C22 of the cap C may contact the side surface of the inner cover C6.

When seen from a bottom surface illustrated in A of FIG. 11, the inner cover C6 is provided with the opening C10 at the center thereof, and is formed in a ring shape. On an inner side of the above ring, the protrusions C61 with a semicircular shape are provided at equal intervals at positions of directions 12 o'clock, 3 o'clock, 6 o'clock, and 9 o'clock so as to inscribe the side surface of the canopy portion B1 of the rubber stopper B2.

The gaps C41 are provided at four places between the inner cover C6 and the rubber stopper B2. When the rubber stopper B2 contacts the protrusions C61 with the approximately semicircular shape, the rubber stopper B2 is pressed and the rubber stopper B2 can be extended to the gaps C41. Therefore, when the rubber stopper B2 is extended to the gaps C41 formed between the protrusion C61 and the protrusion C61 in the inner cover C6, a pressure at the time of capping can be reduced.

The position, number, and shape of the approximately semicircular protrusions C61 provided in the inner cover C6 and the gaps C41 provided between the inner cover C6 and the rubber stopper B2 are not limited.

As described in the embodiment, a coefficient of friction between the inner cover C6 and the rubber stopper B2 is higher than a coefficient of friction between the inner cover C6 and the cap C, as a result, only the cap C rotates, and rotation of the inner cover C6 and the rubber stopper B2 can be inhibited.

An inner cover C7 illustrated in FIG. 12 is formed so that an outer diameter thereof is larger than an outer diameter d4 of a canopy portion B31 of a rubber stopper B3, the continuous side surface cover C34 is formed in a circular shape, inside convex shapes are formed from an inner wall surface of the side surface cover C34 at equal intervals, which contact a side surface of the canopy portion B31 of the rubber stopper B3 when seen from a bottom surface illustrated in A of FIG. 12. An inner peripheral surface of the inner cover C7 is provided with an approximately semicircular protrusion C71.

Note that the gap C40 is provided between a side surface of the inner cover C7 and the inner wall surface C22 of the cap C; however, the inner wall surface C22 of the cap C may contact the side surface of the inner cover C7.

When seen from a bottom surface illustrated in A of FIG. 12, the inner cover C7 is provided with the opening C10 at the center thereof, and is formed in a ring shape. The inner cover C7 can be the same shape as the rubber stopper B3 contained therein. The protrusions C71 of the inner cover C7 are provided at equal intervals while forming gaps C41 at positions of directions 1 o'clock, 4 o'clock, 7 o'clock, and 10 o'clock so as to contact the side surface of the canopy portion B31 of the rubber stopper B3.

Note that a plurality of protrusions C31 can be provided inside the protrusions C71, that is, at positions in a concentric circle shape of the inner cover C7.

Moreover, when the rubber stopper B3 contacts the protrusions C71 of the inner cover C7, the rubber stopper B3 is pressed and the rubber stopper B3 can be extended to the gaps C41. Therefore, when the rubber stopper B3 is extended to the gaps C41 formed between the inner cover C7 and the rubber stopper B3, a pressure at the time of capping can be reduced.

In the inner cover C7, a recess B32 provided on the side surface of the canopy portion B31 of the rubber stopper B3 closely contacts the protrusion C71 of the inner cover C7; therefore, only the cap C rotates, and rotation of the inner cover C7 and the rubber stopper B3 can be inhibited. A coefficient of friction between the inner cover C7 and the rubber stopper B3 is higher than a coefficient of friction between the inner cover C7 and the cap C, as a result, only the cap C rotates, and rotation of the inner cover C3 and the rubber stopper B3 can be inhibited.

The position, number, and shape of protrusions C71 provided in the inner cover C7 and the gaps C41 provided between the inner cover C7 and the rubber stopper B3 are not limited.

3. Closed-System Drug Transfer Device

The present invention also provides a closed system drug transfer device using the above-described cap C according to the present invention and the later-described plastic adapter E. Since the cap C is as described above, description therefor is omitted here.

The plastic adapter E can be attached so as to cover the entire cap C from an upper part of the cap C according to the present invention as illustrated in FIG. 9 and FIG. 10. A lower portion of the cap C is attached to the lip A2 of a vial which is the pharmaceutical container A.

Here, the definition of the Closed System Drug Transfer Device (CSTD) will be explained. The closed system drug transfer device may indicate two items which are a closed system connection instrument (not illustrated) and a closed system dosing route; however, the former closed system connection instrument is mainly indicated in the present description.

The adapter E includes a top surface portion E1 having a fitting portion E11 at the center thereof, and a cylindrical skirt portion E2 extending downward from an outer periphery of the top surface portion E1 and opening at a lower end. The fitting portion E11 has a lip E112 and an intermediate tube E113 extending downward from the lip E112, and the fitting portion E11 fits to a medical instrument which is a closed system connection instrument.

Note that a vial adapter having a common needle portion is cited as the medical instrument. The adapter E which has the above structure can maintain aseptic properties inside the pharmaceutical container A while preventing exposure due to the leakage or the like of aerosol, vapor, and liquid from the interior of the pharmaceutical container A, and can be safely applied to the closed system drug transfer device.

As described above, the cap C has at least one or more slit portions C21 in the skirt portions C2 as illustrated in FIG. 4 and FIG. 5 according to the preferred embodiment of the present invention. A plurality of slit portions C21 are preferably formed, which are formed, for example, at three places. The slit portions C21 can be used as a positioning mechanism used when the cap C according to the present invention is fitted to the plastic adapter E. As the positioning mechanism for the adapter E, for example, a method for providing a convex-shaped member E22 on an inner wall of the skirt portion C2 and the like.

As described above, the top surface portion C1 of the cap C has a disc shape, and the opening C10 is formed at the central portion thereof. The size of the opening C10 is not particularly limited as long as effects of the present invention can be obtained. In the closed system drug transfer device according to the present invention, a puncturing portion E3 fits to the center of the opening C10 to puncture the rubber stopper B held inside the cap C.

A method for using the closed system drug transfer device according to the present invention described above will be explained with reference to FIG. 9.

First, after the pharmaceutical container A is filled with a desired drug, the rubber stopper B with a suitable size is fitted into the opening A1 of the pharmaceutical container A to seal the pharmaceutical container A. Subsequently, when the cap C is fitted to the pharmaceutical container A which is sealed with the rubber stopper B by preferably using the capping machine, the rubber stopper B and the cap C are fixed to each other. The pharmaceutical container A storing a drug is used for the CSTD by a user such as a healthcare worker. The adapter E is fitted to the cap C so as to cover the cap C while performing positioning by the slit portions C21, thereby fixing the cap C and the adapter E to each other. Next, the user punctures a rubber stopper E111 from the lip E112 side by using a medical instrument which is the closed system connection instrument to thereby transfer the drug.

In the above described example, after the rubber stopper B is fitted to the opening A1 of the pharmaceutical container A so as to make the pharmaceutical container A hermetically sealed, the cap C is fitted to the rubber stopper B, and further, the adapter E is fitted to the cap C; however, the present invention is not limited to this.

INDUSTRIAL APPLICABILITY

As apparent from the above, according to the present invention, there is provided a plastic cap that can be smoothly applied to either a synthetic resin or glass pharmaceutical container, and further, that can be smoothly applied for lyophilization, in which a coefficient of friction between an inner cover and a rubber stopper is higher than a coefficient of friction between the inner cover and the cap when the cap is fitted to a mouth portion of the pharmaceutical container which is capped with the rubber stopper, and the cap only rotates in an idling fashion without the inner cover following the rotation and without the rubber stopper rotating, thereby maintaining airtightness.

REFERENCE SIGNS LIST

A: pharmaceutical container
A1: opening
A2: lip
B: rubber stopper
B1: canopy portion
B11: leg portion
B2: rubber stopper
B3: rubber stopper
B31: canopy portion
B32: recess
C: plastic cap
C1: top surface portion
C10: opening
C11: protrusion
C2: skirt portion
C21: slit portions
C22: inner wall surface
C3: inner cover
C30: base portion
C31: protrusion
C32: top surface portion
C33: side surface
C34: side surface cover
C35: cutout portion
C36: guide
C4: locking claw
C40: gap
C41: gap
C5: through hole
C6: inner cover
C61: protrusion
C7: inner cover
C71: protrusion
D: cover
D1: finger hook
E: plastic adapter
E1: top surface portion
E11: fitting portion
E111: rubber stopper
E112: lip
E113: intermediate tube
E2: skirt portion
E21: locking claw
E22: convex-shaped member
E3: puncturing portion

The invention claimed is:

1. A plastic cap (C) attached to a pharmaceutical container (A) having a rubber stopper (B) covering an opening of the pharmaceutical container (A), the cap (C) comprising:
a top surface portion (C1) having an opening (C10) at the center thereof;
a cylindrical skirt portion (C2) extending downward from an outer periphery of the top surface portion (C1) and opening at a lower end; and
an inner cover (C3) provided inside the skirt portion (C2),
wherein the top surface portion (C1) and the inner cover (C3) are made of plastic,
wherein the top surface portion (C1) and the cylindrical skirt portion (C2) are rotatable relative to the inner cover (C3), and
wherein a coefficient of friction between the inner cover (C3) and the rubber stopper (B) is higher than a coefficient of friction between the inner cover (C3) and a lower surface of the top surface portion (C1) so that when the top surface portion (C1) and the cylindrical skirt portion have a lateral force applied, the inner cover (C3) does not rotate relative to the rubber stopper (B).

2. The plastic cap according to claim 1,
wherein the inner cover (C3) includes a protrusion (C31) for engaging with the rubber stopper (B).

3. The plastic cap according to claim 2,
wherein a plurality of protrusions (C31) are formed.

4. The plastic cap according to claim 1
wherein the inner cover (C3) includes at least one or more convex shapes on a top surface portion (C32).

5. The plastic cap according to claim 1,
wherein the skirt portion (C2) includes at least one or more slit portions (C21).

6. The plastic cap according to claim 1,
wherein a cover (D) which is removable by fingers is provided on an upper surface of the top surface portion (C1).

7. A closed system drug transfer device which is fittable to a medical instrument, the closed system drug transfer device comprising:
a pharmaceutical container (A) having an opening;
a rubber stopper (B) covering the opening of the pharmaceutical container;
a plastic cap (C) attached to the pharmaceutical container (A), the cap including
a top surface portion (C1) having an opening (C10) at the center thereof,
a cylindrical skirt portion (C2) extending downward from an outer periphery of the top surface portion (C1) and opening at a lower end, and
an inner cover (C3) provided inside the skirt portion (C2),
wherein the top surface portion (C1) and the cylindrical skirt portion (C2) are rotatable relative to the inner cover (C3), and
wherein a coefficient of friction between the inner cover (C3) and the rubber stopper (B) is higher than a coefficient of friction between the inner cover (C3) and a lower surface of the top surface portion (C1) so that when the top surface portion (C1) and the cylindrical skirt portion have a lateral force applied, the inner cover (C3) does not rotate relative to the rubber stopper (B); and
a plastic adapter (E) attached to the plastic cap (C), the adapter including
a top surface portion (E1) having a fitting portion (E11) at a center thereof, and
a cylindrical skirt portion (E2) extending downward from an outer periphery of the top surface portion (E1) and opening at a lower end,
wherein the fitting portion (E11) has a lip (E112) and an intermediate tube (E113) extending downward from the lip (E112), and the fitting portion (E11) fits to the medical instrument.

* * * * *